United States Patent Office 3,302,555
Patented Feb. 7, 1967

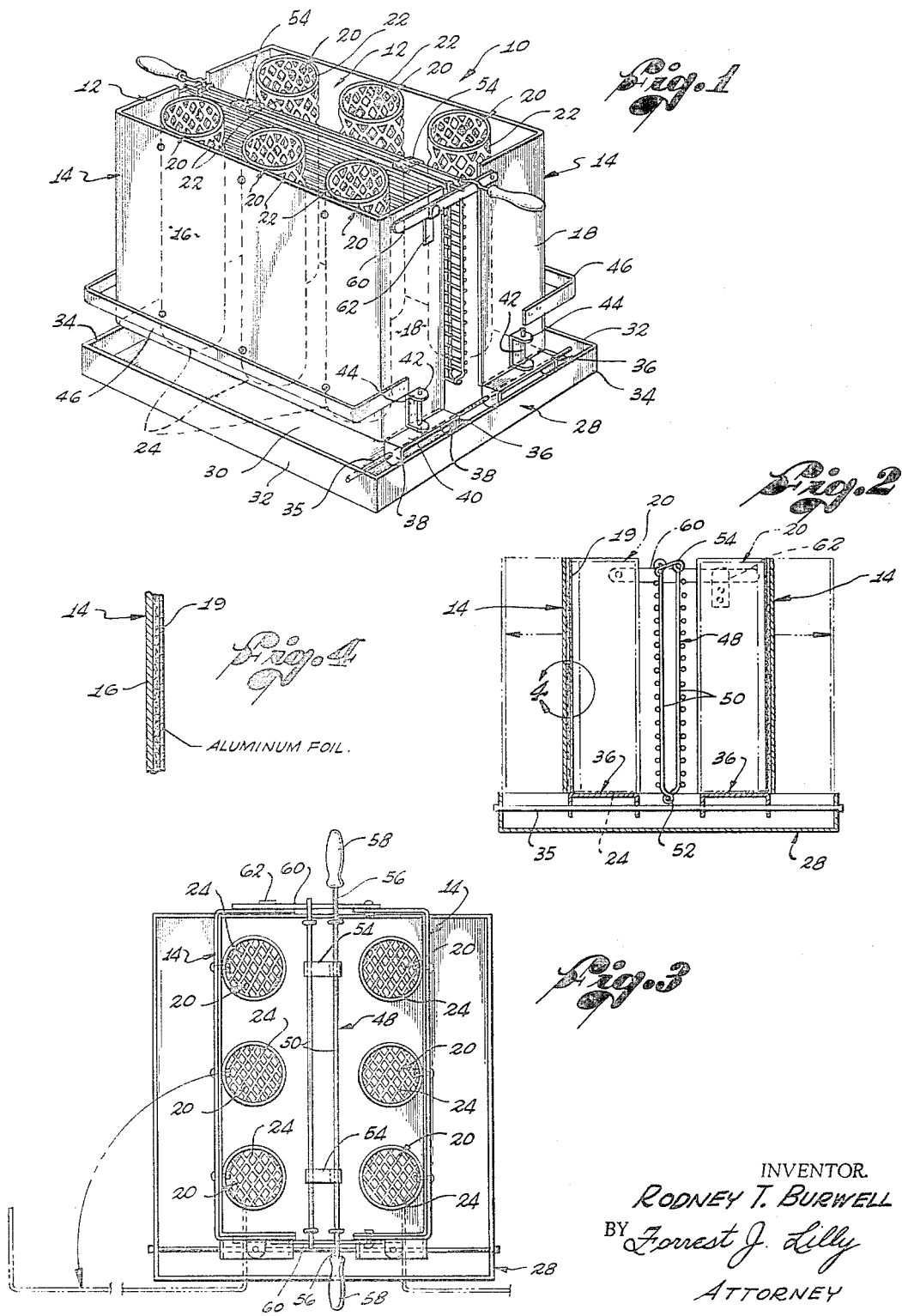

3,302,555
CHARCOAL BRAZIER
Rodney T. Burwell, 3762 Alta Mesa Drive,
Studio City, Calif. 91604
Filed May 24, 1965, Ser. No. 458,061
8 Claims. (Cl. 99—390)

This invention relates generally to cooking appliances and has more particular reference to improvements in charcoal braziers.

In recent years, charcoal braziers have gained widespread popularity for both indoor and outdoor cookery. This increase in popularity, in turn, has led to the development of a great variety of braziers. Such braziers have ranged in design from simple, inexpensive units, suitable only for broiling and other similar cookery, to more sophisticated and costly units equipped with such accessories as ovens, smoke-curing enclosures, rotisseries, temperature gauges, and the like. However, most, if not all, of these various brazier designs which have gained a reasonable degree of commercial acceptance have embodied the same basic brazier construction. This basic construction consists of a charcoal receptacle, or fire bowl, with an open top and a grill, or the like, disposed in a horizontal position over the receptacle for supporting the food to be cooked. Generally, the grill is vertically adjustable relative to the charcoal receptacle to afford some degree of control over the effective cooking temperature.

This basic brazier construction possesses certain inherent deficiencies which the present invention seeks to overcome. One of these deficiencies resides in the fact that only the underside of the food being cooked is directly exposed to the hot coals in the charcoal receptacle. For this reason, the existing braziers possess poor cooking efficiency and, therefore, require a relatively long cooking time to obtain a given effective exposure time of the food to the heat of the charcoal. Moreover, the food must be periodically turned over, with the result that the braziers must be constantly attended for substantially the entire cooking time. The existing braziers of the kind under discussion are also ill-suited to cooking foods, such as poultry, which are best cooked by exposure to a medium cooking temperature for a relatively long period of time. Thus, because of the poor efficiency of and long cooking time required by the existing braziers, the latter must be supplied with a relatively large initial charge of charcoal to assure the proper cooking temperature during the final portion of the cooking period. Such a large initial charge of charcoal, however, creates excessively high temperatures during the first portion of the cooking period so that the food is frequently scorched or charred on the outside even before its interior has reached the proper cooking temperature. Moreover, because of this poor efficiency, the existing braziers waste charcoal.

The above-described deficiency of the existing braziers is mitigated, to some extent, if they are provided with a rotisserie for continuously revolving the food being cooked. However, such rotisseries add substantially to the cost of the brazier. In addition, the quantity of food which may be placed on the average rotisserie is quite limited, and the placement of the brazier with such a rotisserie is restricted to locations having an available electrical power supply for the rotisserie motor.

Another inherent deficiency of the existing braziers resides in the fact that when meat is cooked, its drippings fall directly onto the hot coals. An undesirable volume of smoke is thereby created which renders it difficult to properly attend the brazier. Such meat drippings also frequently ignite and create flame which, in turn, may ignite the meat on the grill. The accumulation of meat drippings in the charcoal receptacle is also undesirable for the reason that it makes necessary and difficult the task of frequently cleaning the receptacle if the brazier is to be maintained in some semblance of cleanliness.

Many of the existing braziers are deficient because of their large size and inability to be collapsed for convenience of storage and transportation. Such large size and non-collapsibility of the braziers is a particular disadvantage when the braziers are used indoors.

It is apparent at this point, therefore, that there is a definite need for an improved charcoal brazier which is not subject to the deficiencies noted above.

A general object of this invention is to provide such an improved charcoal brazier.

A more specific object of the invention is to provide an improved charcoal brazier which permits controlled and generally uniform exposure of either one side or both sides of the food being cooked to the hot coals contained in the brazier, whereby superior cooking of the food is achieved in minimum time, without periodically turning the food over, and thereby with minimum attention to the brazier and minimum consumption of charcoal.

Another object of the invention is to provide a charcoal brazier wherein the smoke and flame occasioned by contact, with the hot coals, of drippings from meat or other food being cooked is materially reduced or eliminated.

Yet another object of the invention is to provide a charcoal brazier which may be easily cleaned.

A further object of the invention is to provide a charcoal brazier which is readily collapsible for convenience of storage and transportation.

Yet a further object of the invention is to provide a charcoal brazier which is light in weight, compact, inexpensive, and otherwise ideally suited to its intended purposes.

Briefly, the objects of the invention are attained by providing a charcoal brazier equipped with a pair of upright charcoal receptacles and a food holder which is suspended in a generally vertical position between the receptacles. Each receptacle includes one, and preferably a plurality of, separate, upright charcoal baskets. Both the food holder and the charcoal baskets have an essentially open construction, whereby each side of food contained in the holder is exposed to hot coals contained within the adjacent charcoal baskets. According to the preferred practice of the invention, for example, the food holder comprises a pair of wire grills which are releasably joined to receive therebetween the food to be cooked and the charcoal baskets comprise sleeves constructed of so-called expanded metal, or the like. A pan is positioned below the charcoal receptacles and the food holder to collect drippings from the food being cooked, ashes which drop from the charcoal baskets, and other material.

The charcoal receptacles are supported on the underlying drip pan in a novel way which retains the receptacles in their upright positions while permitting adjustment of the receptacles toward and away from one another.

When the brazier is not in use, the unit may be collapsed for convenience of storage and transportation. Also, the charcoal receptacles are readily removable from the drip pan to facilitate cleaning the pan.

A presently preferred embodiment of the invention will now be described by reference to the attached drawing, wherein:

FIG. 1 is a perspective view of a typical charcoal brazier according to the invention;

FIG. 2 is a vertical section through the brazier;

FIG. 3 is a plan view of the brazier; and

FIG. 4 is an enlargement of the area encircled by the arrow 4 in FIG. 3.

The improved charcoal brazier 10 illustrated in this drawing comprises a pair of charcoal receptacles 12. Each receptacle comprises an upright, 3-sided housing 14 having a rear or outer wall 16 and end walls 18. The inner side as well as the top and bottom of each receptacle housing are open. The inner surfaces of each housing are covered by an asbestos lining 19. Mounted within each receptacle housing are three upright charcoal baskets 20. Each charcoal basket comprises a cylindrical sleeve 22 having a lower end wall 24. The upper end of each basket is open. The cylindrical side wall of each charcoal basket is formed with a multiplicity of openings. To this end, the sleeve 22 of each basket may be constructed of expanded metal or other suitable open metallic sheet material.

Below the charcoal receptacles 12 is a drip pan 28. This drip pan includes a bottom wall 30 and upstanding flanges 32 and 34 rising from the sides and ends, respectively, of the bottom wall. Extending between and secured in the side flanges 32 of the drip pan 28, adjacent and parallel to one end of the pan, is a rod 35. This rod slidably mounts a pair of generally yoke-shaped brackets or slides 36. Each slide 36 includes depending legs 38 which are apertured to slidably receive the rod 35 and a connecting member 40 joining the legs. Centrally secured to and extending from the connecting member 40 of each slide 36, in a direction normal to the rod 35, is a pin 42. One end wall 18 of each charcoal receptacle housing 14 mounts a rigid bracket 44 which is apertured to removably receive the pin 42 on one of the slides 36. In the normal assembled condition of the brazier 10, the charcoal receptacles 12 are positioned on the drip pan 28 in the manner illustrated in the drawing, wherein it will be observed that one end of the housing 14 of each receptacle rests on the drip pan flange 34 remote from the rod 35. The opposite end of the housing of each charcoal receptacle rests on the upper connecting member 40 of its respective slide 36. The slide pins 42 engage in the brackets 44 on the receptacle housings. These pins and brackets, then, form interfitting mounting members for the charcoal receptacles which retain the latter in their upright positions. As explained shortly, the interfitting members are vertically engageable and disengageable to permit removal of the receptacles from the drip pan.

At this point, therefore, it is significant to note that the slides 36 serve two functions. First, these slides retain the charcoal receptacles 12 in their normal upright positions illustrated. Secondly, the slides support the charcoal receptacles for lateral movement toward and away from one another, thereby to permit the spacing between the two receptacles to be adjusted. It should also be noted that the charcoal receptacles may be rotated or "fanned" toward and away from one another about the slide pins 42 as centers, thereby to provide a greater spacing between the receptacles at one end than at the other end. A handle 46 is secured to the housing 14 of each charcoal receptacle to facilitate these adjustments of the receptacles while the brazier is in use.

It will be noted that the housings 14 of the charcoal receptacles 12 are disposed with their open sides facing one another.

In the space between these confronting open sides of the receptacle housing is a food holder 48. This food holder comprises a pair of wire grills 50 which are releasably and hingeably joined along their lower edges by hinge means 52. The grills 50 are joined along their upper edges and releasable clasps 54. Extending outwardly from the upper edge of one of the grills 50 are rods 56 mounting handles 58 at their outer ends.

Pivotally mounted on the end walls 18 of one of the receptacle housings 14 are a pair of food holder supporting arms 60. The end walls 18 of the other receptacle housing 14 mount brackets 62 for receiving the outer ends of these arms when the charcoal receptacles 12 are disposed in their normal position of use, as shown best in FIG. 1. The food holder 48 is suspended in a vertical position between the charcoal receptacles 12 by resting the rods 56 of the holder on the hinged supporting arms 60, in the manner shown.

When the brazier 10 is to be used, it is assembled in the manner illustrated and the charcoal baskets 20 are filled with charcoal. After the charcoal has been ignited and the coals are glowing in the proper manner for cooking, the food holder 48 is opened to receive the food to be cooked, after which the upper edges of the grills 50 of the holder are secured together by the clasps 54. The food holder is then placed between the charcoal receptacles, as shown. Both sides of the food are thereby directly exposed to the hot coals in the charcoal receptacles 12. It is apparent, of course, that all of the charcoal baskets 20 need not be filled. For example, when cooking some types of food, it may be desirable to employ a relatively low temperature cooking heat, in which case only the two center charcoal baskets may be filled. If a slightly higher cooking temperature is desired, two charcoal baskets in each charcoal receptacle may be filled with charcoal. In this case, the two outer baskets in each receptacle may be used in order to obtain more uniform exposure of the food to the heat of the coals in the baskets. When a maximum cooking temperature is desired, all of the charcoal baskets may be used. This ability to control the effective cooking temperature in the brazier by selective filling of the charcoal baskets with charcoal constitutes a highly unique and important advantage of the invention. Additional control over the cooking temperature may be obtained, of course, by adjustment of the charcoal receptacles toward and away from one another either by bodily moving them in or out or by swinging or fanning the receptacles about the slide pins 42, in the manner mentioned earlier.

The above-mentioned direct exposure of both sides of the food being cooked to the hot coals in the charcoal baskets 20 constitutes a second highly unique and important feature of the invention. As noted earlier, this direct exposure of both sides of the food to the hot coals is in contrast to most conventional braziers, in which only the underside of the food is so exposed. As a consequence of this direct exposure of both sides of the food to the hot coals, the food is cooked more quickly, more evenly, and with less chance of scorching or charring the outside of the food than is possible in the existing braziers. In addition, of course, it is not necessary to periodically turn the food over, as must be done in the existing braziers. The present brazier, therefore, requires less attention.

A third important advantage of the present brazier construction resides in the fact that when cooking meat or other food which exudes fat, the drippings fall into the drip pan 28 rather than onto the hot coals. As a consequence, the present brazier creates little, if any, smoke when in use. The absence of smoke, of course, makes it much easier to properly attend the brazier when cooking. Moreover, the flare-up of flame occasioned in the existing braziers by the contact of meat drippings with the hot coals is virtually eliminated in the present improved brazier construction. Accordingly, there is little, if any, tendency for the food being cooked to catch fire. Collection of the drippings in the drip pan 28, rather than in the fire bowl as occurs in existing braziers, is desirable, of course, since it simplifies the task of maintaining the brazier in the proper condition of cleanliness. In this connection, attention is directed to the fact that the charcoal receptacles 12 may be readily removed from the drip pan 28 by simply lifting the receptacles off the slide pins 42. The drip pan, therefore, may be quickly and easily cleaned after each use. Similarly, ashes and unburned coals may be quickly and easily emptied from the charcoal baskets 20. It is apparent, of course, that any ashes which drop from the charcoal baskets while the brazier is in use are collected in the drip pan 28.

When the brazier is not in use, the charcoal receptacles may be moved into direct contact with opposite sides of the food holder 48 for convenience of storage. Alternatively, the charcoal receptacles may be removed from the slide pins 42 and laid on their side in the drip pan.

It is apparent, therefore, that the invention herein described is fully capable of attaining the several objects and advantages preliminarily set forth. While a presently preferred embodiment of the invention has been described and illustrated, it is apparent that various modifications in the design, arrangement of parts, and instrumentalities of the invention are possible within the spirit and scope of the following claims.

I claim:
1. A charcoal brazier comprising:
    a drip pan,
    a pair of upright charcoal receptacles, each having an open side,
    means removably mounting said receptacles on said drip pan with said open sides of the receptacles confronting one another, said mounting means including pairs of upright interfitting, vertically engageable and disengageable mounting members for said receptacles, respectively, and means securing said members of each pair to the corresponding receptacle and said drip pan, respectively, in such manner that said members when engaged are effective to positively retain said receptacles in their upright positions and said receptacles are removable from said drip pan by upward movement relative to said drip pan,
    a food holder, and
    means removably supporting said food holder between said receptacles.

2. A charcoal brazier comprising:
    a drip pan,
    a pair of upright charcoal receptacles, each having an open side,
    means slidably supporting said charcoal receptacles in upright positions on said drip pan with said open sides of said receptacles confronting one another and in such manner as to permit said receptacles to be adjusted toward and away from one another, thereby to vary the spacing therebetween, said supporting means including a rod carried by said drip pan, a pair of slides movable along said rod, and hinge means connecting said charcoal receptacles to said slides, respectively, for swinging of said receptacles about axes normal to said drip pan, whereby said receptacles are bodily adjustable toward and away from one another and are swingable toward and away from one another,
    a food holder, and
    means removably supporting said food holder between said receptacles.

3. A charcoal brazier comprising:
    a drip pan including a bottom wall and upstanding side and end flanges rising from the edges of said wall,
    a rod extending between and supported by said side flange adjacent and parallel to one end flange of said drip pan,
    a pair of charcoal receptacles each including a 3-sided metal housing including an outer wall and two end walls, whereby the inner side, top and bottom of said housing are open, and a plurality of charcoal baskets mounted side by side within said housing against said outer wall thereof, each charcoal basket having an open top and a multiplicity of openings in its side wall,
    a pair of slides mounted on said rod for movement therealong, each slide including an upstanding pin,
    a bracket on one end wall of each receptacle housing, said housing brackets being perforated to receive said slide pins for supporting said charcoal receptacles in an upright position on said drip pan with the open inner sides of said receptacles confronting one another, said receptacles being bodily adjustable toward and away from one another and being swingable toward and away from one another about said slide pins,
    a pair of arms hinged to the end walls of one of said receptacle housings adjacent the upper end and inner side of said one housing,
    a pair of brackets mounted on the end walls of the other receptacle housing for receiving the outer ends of said arms and supporting said arms in a generally horizontal position when said charcoal receptacles are supported in position on said drip pan, and
    a food holder comprising a pair of wire grills and rods extending outwardly from the upper edge of said food holder for resting on said arms, thereby to suspend said food holder in a vertical position between said charcoal receptacles.

4. A brazier according to claim 1, wherein:
    each pair of said mounting members comprises a normally upright pin on said drip pan and a bracket on the corresponding charcoal receptacle slidably fitted on said pin.

5. A brazier according to claim 1, wherein:
    said pairs of mounting members comprise lower members on said drip pan, and
    said securing means for said mounting members comprise means supporting said lower members on said drip pan for relative movement toward and away from one another, thereby to permit adjustment of said charcoal receptacles toward and away from one another.

6. A brazier according to claim 2, wherein:
    said hinge means for each charcoal receptacle comprises releasably engaged members on the corresponding receptacle and slide, respectively, whereby said receptacles are removable from said drip pan.

7. A charcoal brazier comprising:
    a drip pan having a bottom wall and upstanding flanges along two edges of said bottom wall,
    a pair of upright charcoal receptacles disposed directly over said drip pan including housings, respectively, having confronting open sides facing one another, open bottoms facing the bottom wall of said drip pan, and open tops, and perforate charcoal baskets mounted in said housings, respectively,
    means extending between said drip pan flanges slidably supporting said charcoal receptacles on said drip pan for adjustment of said receptacles toward and away from one another with the open bottoms of said receptacles spaced from the bottom wall of said drip pan, thereby to define between said bottom wall and the bottoms of said receptacles spaces through which air may flow to said charcoal baskets,
    a food holder, and
    means removably supporting said food holder between said receptacles.

8. A brazier according to claim 7, wherein:
    said receptacle supporting means comprise an additional upstanding flange on said drip pan rising above the bottom wall of said drip pan between said first mentioned drip pan flanges and having an upper edge slidably seating said charcoal receptacles for slidable adjustment of said receptacles along said upper flange edge.

References Cited by the Examiner

UNITED STATES PATENTS

| | | | |
|---|---|---|---|
| 1,656,181 | 1/1928 | Elbert | 99—390 X |
| 2,335,217 | 11/1943 | Tate | 99—390 X |
| 2,923,229 | 2/1960 | Halford | 99—390 X |
| 2,946,275 | 7/1960 | Compton | 99—390 |
| 2,975,698 | 3/1961 | Miller | 99—390 |
| 3,052,177 | 9/1962 | Lombardo | 99—390 |
| 3,056,344 | 10/1962 | Miller | 99—390 |
| 3,091,170 | 5/1963 | Wilson | 99—390 |
| 3,140,651 | 7/1964 | Barnett | 99—389 X |

BILLY J. WILHITE, *Primary Examiner.*